United States Patent [19]
Brown

[11] Patent Number: 5,710,379
[45] Date of Patent: Jan. 20, 1998

[54] APPARATUS AND METHOD FOR DETERMINING A FLOW COUNT

[75] Inventor: Alvin E. Brown, Santa Cruz, Calif.

[73] Assignee: Dieterich Technology Holding Corp., Boulder, Colo.

[21] Appl. No.: 720,791

[22] Filed: Oct. 4, 1996

[51] Int. Cl.$^6$ ........................................ G01F 1/66
[52] U.S. Cl. .................... 73/861.28; 73/861.31; 73/861.27
[58] Field of Search .................. 73/861.27, 861.28, 73/861.29, 861.31

[56] References Cited

U.S. PATENT DOCUMENTS

| | | | |
|---|---|---|---|
| 3,780,577 | 12/1973 | Brown | 73/861.28 |
| 4,300,400 | 11/1981 | Bistrian, Jr. et al. | 73/861.28 |
| 4,509,373 | 4/1985 | Brown | 73/861.28 |
| 5,005,425 | 4/1991 | Ohmae | 73/861.23 X |
| 5,052,230 | 10/1991 | Lang et al. | 73/861.28 |
| 5,117,698 | 6/1992 | Baumoel | 73/861.28 |
| 5,163,331 | 11/1992 | Gill | 73/861.28 |
| 5,553,505 | 9/1996 | Bignell et al. | 73/861.28 |

*Primary Examiner*—Elizabeth L. Dougherty
*Attorney, Agent, or Firm*—Richard W. Hanes

[57] ABSTRACT

An apparatus for determining a flow count in an ultrasonic flow meter has an upstream oscillator (22) with an upstream signal (24) having a period proportional to an upstream transit time and a downstream oscillator (26) with a downstream signal (28) having a period proportional to a downstream transit time. The upstream signal (24) is coupled to a positive increment input (30) of a counter (32) and the downstream signal (28) is coupled to a negative increment input (36) the counter (32).

21 Claims, 4 Drawing Sheets

APPARATUS AND METHOD FOR DETERMINING A FLOW COUNT

FIELD OF THE INVENTION

The present invention relates generally to the field of ultrasonic flow meters and more particularly to an apparatus and method for determining a flow count in an ultrasonic flow meter.

BACKGROUND OF THE INVENTION

Ultrasonic flow meters have many advantages over other methods of determining flow rates. Ultrasonic flow meters can continuously measure the flow rate, while other methods generally measure average flow rates. In addition, ultrasonic flow meters are obstructionless and work with non-conductive fluids.

Ultrasonic flow meters have a pair of transducers that are placed on either side of the flow path of a fluid flowing through a pipe. The transducers are pointed at each other and placed on either side of the flow path of a fluid flowing through a pipe. The transducers are pointed at each other and the line between them has a component in the direction of the fluid flow. The principle used to detect flow rates is that the transit time of an ultrasonic packet will increase in the upstream and decrease in the downstream path. The amount by which the transit time changes is directly proportional to the flow rate. An upstream voltage controlled oscillator (VCO) is synchronized so that upstream transit time is an integer multiple of a period of the upstream VCO signal. Similarly, a downstream voltage controlled oscillator is synchronized so that the downstream transit time is an integer multiple of a period of the downstream VCO. The upstream signal and downstream signal are mixed and low pass filtered to form a difference (beat) signal that has a frequency that is proportional to the measured flow speed. This process is expensive to implement and requires complex circuitry. In addition, this technique does not determine the direction of fluid flow in the path. Quadrature detection techniques can be used to determine the direction of fluid flow, however this just adds to the cost and complexity of the circuitry.

Thus there exists a need for an apparatus and method that can determine the flow count inexpensively and also determine the direction of fluid flow.

SUMMARY OF THE INVENTION

An apparatus for determining a flow count in an ultrasonic flow meter that overcomes these and other problems has an upstream oscillator with an upstream signal having a period proportional to an upstream transit time and a downstream oscillator with a downstream signal having a period proportional to a downstream transit time. The upstream signal is coupled to a positive increment input of a counter and the downstream signal is coupled to a negative increment input the counter.

DETAILED DESCRIPTION OF THE DRAWINGS

The invention replaces the mixer and low pass filter of the prior art with an up-down counter and buffer circuitry (synchronization and hold circuit). The counter registers a positive increment for every cycle of the upstream signal and registers a negative increment for every cycle of the downstream signal. The output (count) of the counter is then proportional to the difference frequency. The count is periodically sampled by a latch and the latch can be polled by a microprocessor.

Figure 1:
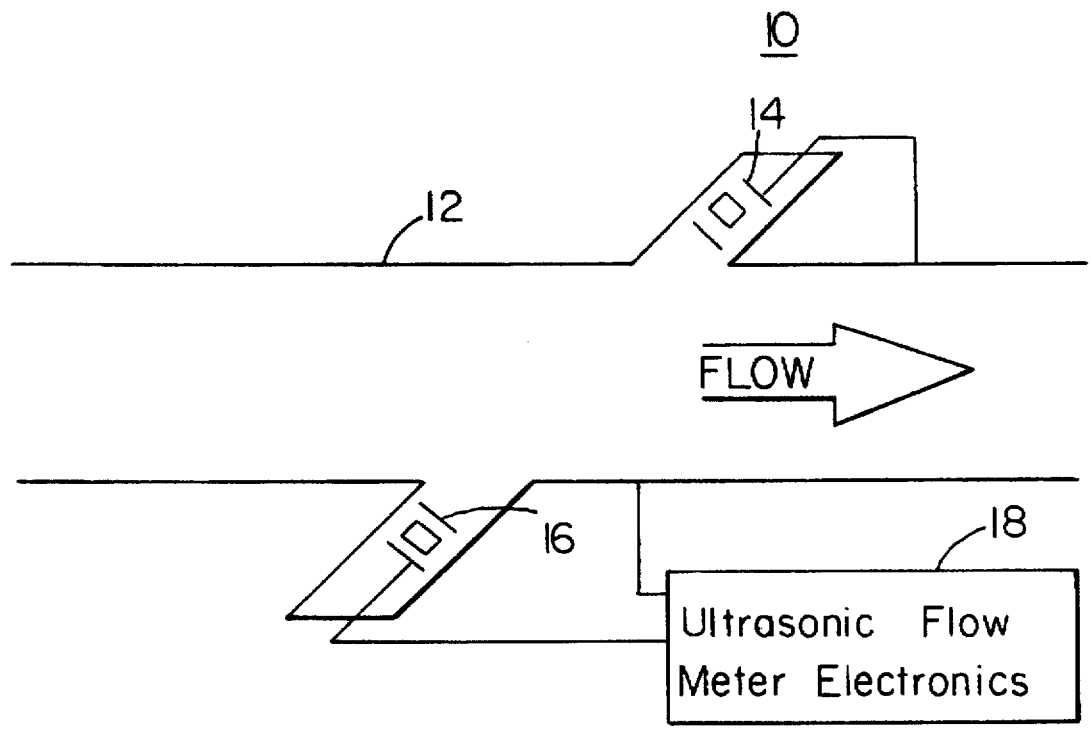
FIG. 1 is a block diagram of a ultrasonic flow meter attached to a conduit.

FIG. 1 is a block diagram of an ultrasonic meter 10 attached to a conduit 12. A pair of transducers 14, 16 are fixed inside the conduit 12. The pair of transducers 14, 16 are coupled to an ultrasonic flow meter electronics 18. The electronics 18 perform all the functions to determine the volume flow rate of the fluid in the conduit 12. One of the functions necessary to determining the volume flow rate is to determine the flow count.

Figure 2:
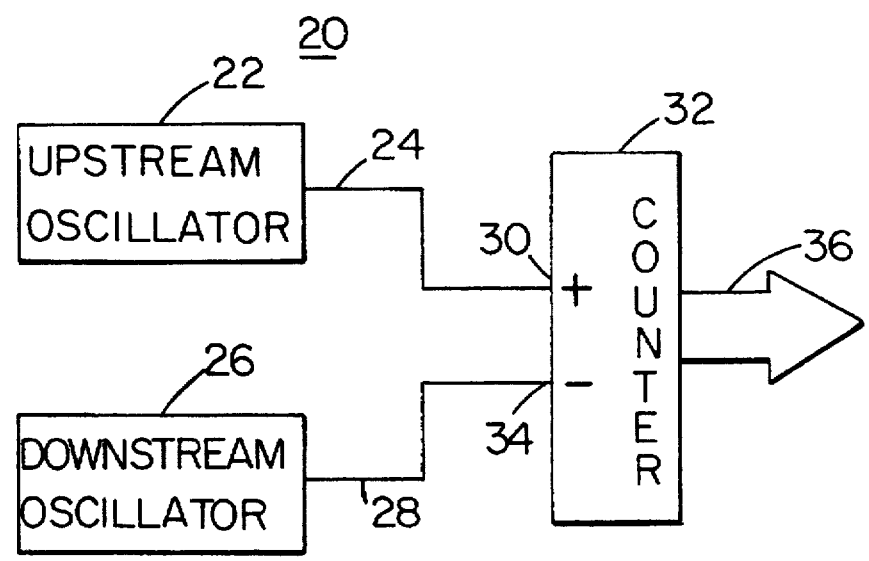
FIG. 2 is an embodiment of an apparatus for determining a flow data count.

FIG. 2 is a block diagram of an embodiment of the apparatus 20 for determining the flow count in the ultrasonic flow meter. An upstream oscillator 22 has an upstream signal 24. The upstream signal 24 has a period that is an integer divisor of a upstream transit time. A downstream oscillator 26 has a downstream signal 28. The downstream signal 28 has a period that is an integer divisor of a downstream transit time. The upstream signal 24 is coupled to a positive increment input 30 of a counter 32. The downstream signal 28 is coupled to a negative increment input 34 of the counter 32. An output (counter signal) 36 is proportional to the flow count.

Figure 3:
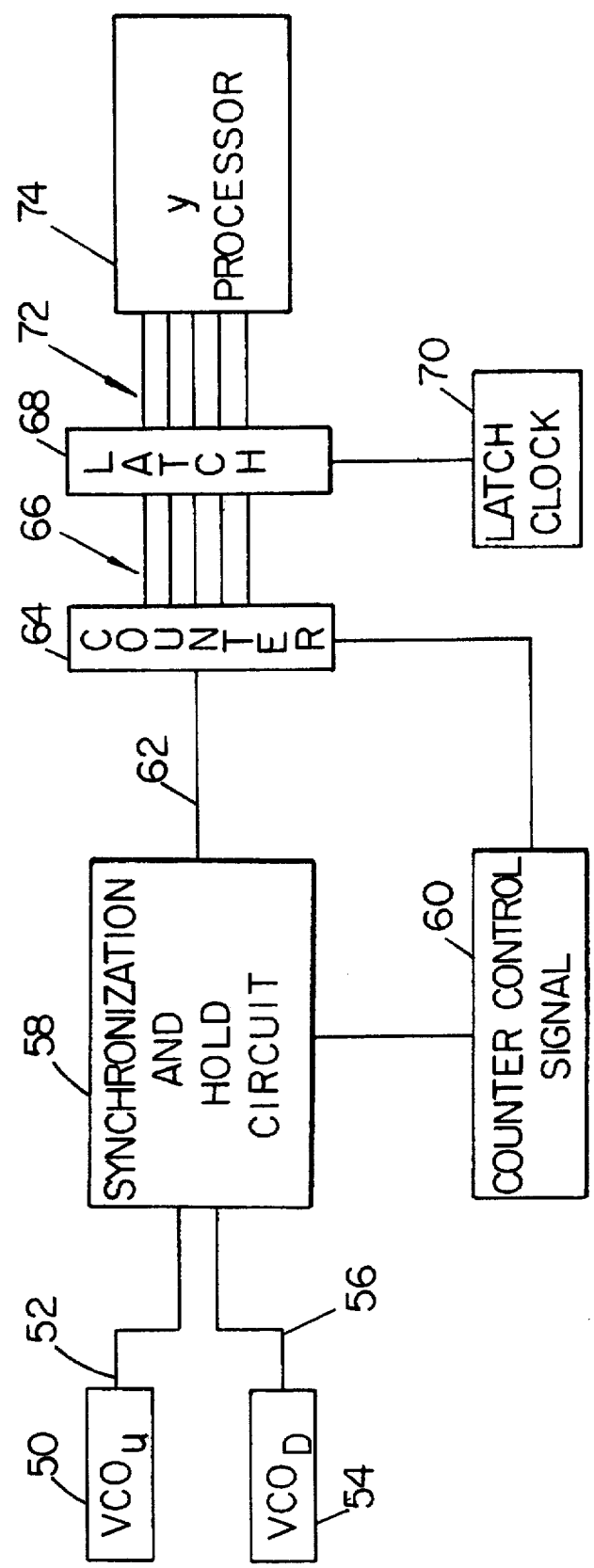
FIG. 3 is another embodiment of the apparatus for determining a flow data count.

The FIG. 3 is a block diagram of an apparatus for determining a flow count in an ultrasonic flow meter. A upstream oscillator 50 has an upstream signal 52 having a period proportional to the upstream transit time. A downstream oscillator 54 has a downstream signal 56 having a period proportional to the downstream transit time. A synchronization and hold circuit 58 has a pair of inputs 52, 56 coupled to the upstream signal 52 and the downstream signal 56. The synchronization and hold circuit 58 buffers and synchronizes the upstream signal 52 and downstream signal 56 to a counter control signal 60. An output 62 of the synchronization and hold circuit is coupled to a up-down counter 64. The counter 64 has an output 66 that is periodically sampled by a latch 68. The latch is coupled to a latch clock 70 that determines when the latch 68 samples the output 66 of the counter. An output 72 of the latch 68 is polled by a microprocessor 74 to retrieve the flow count.

Figure 4:
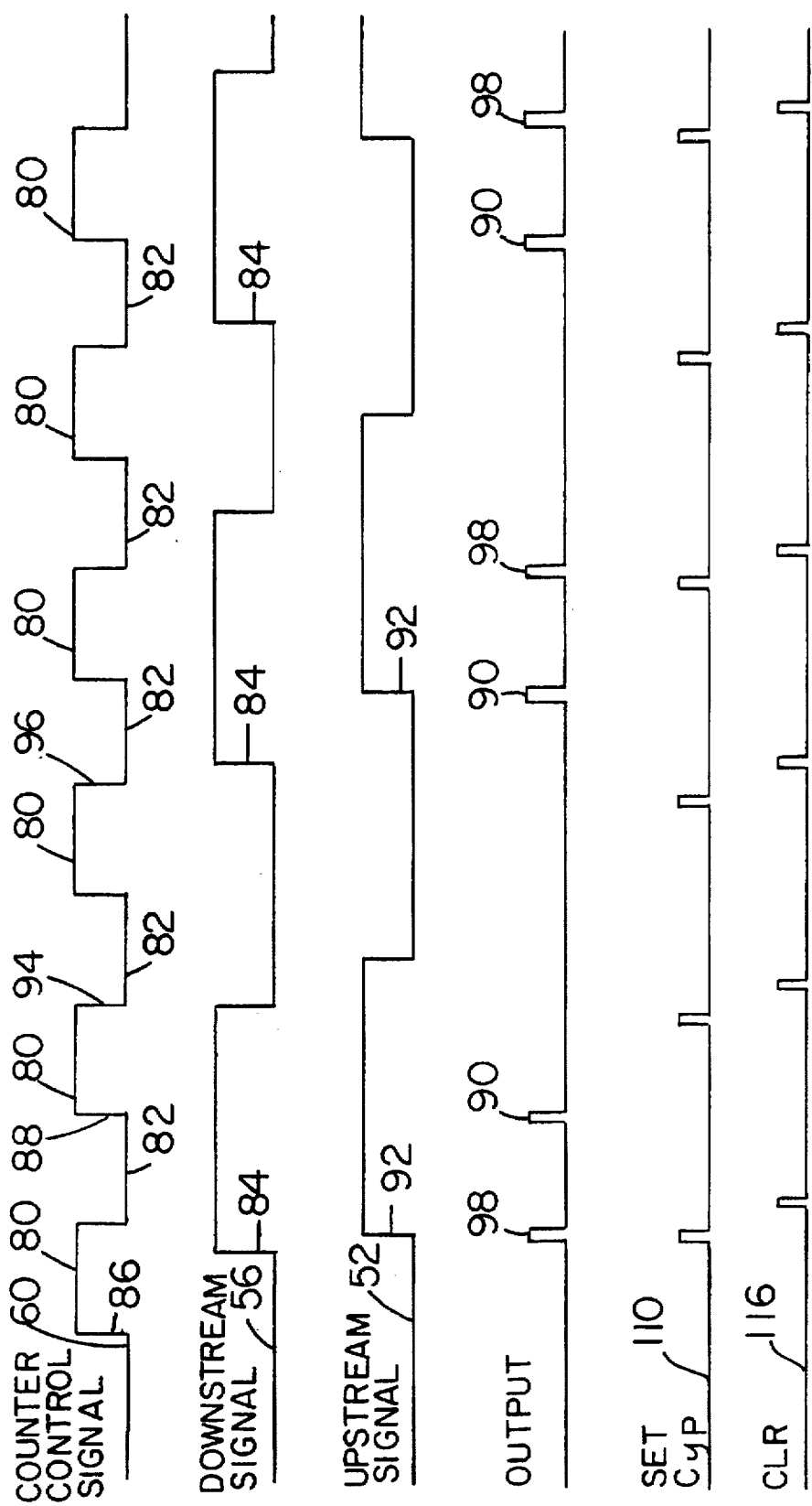
FIG. 4 is a timing diagram of some the signals used in the apparatus of FIG. 3.

FIG. 4 is a timing diagram of the signals in the apparatus of FIG. 3. The counter control signal 60 is a standard square wave having a frequency at least twice the highest frequency of the downstream signal 56. The counter control signal 60 controls the operation of the up-down counter 64. When the counter control signal 60 is in a positive period 80 the counter 64 counts up. When the counter control signal is in a negative period 82 the up-down counter counts down. As a result it is necessary to synchronize the upstream signal 52 and the downstream signal 56 with the counter control signal 60. The synchronization and hold circuit 58 determines if a positive going edge 84 of the downstream signal 56 occurs between a first rising edge 86 before the negative period 82 and the end of the negative period 88. When this occurs the output 62 of the synchronization and hold circuit is true 90. The synchronization and hold circuit 58 determines if a positive going edge 92 of the upstream signal 52 occurs between a first falling edge 94 before the negative period 82 and the end of the positive period 96. When this occurs the output 62 of the synchronization and hold circuit is true 98. In other words the synchronization and hold circuit 58 holds the upstream pulse until the next positive portion 80 of the counter control signal 60, if the upstream signal 52 has a positive transition 92 during the negative portion 82 of the counter control signal 60. Similarly, the synchronization and hold circuit 58 holds the downstream pulse until the next negative portion 82 of the counter control signal, if the downstream signal has a positive transition during the positive portion 80 of the counter control signal 60. This assures that the downstream signal 56 causes the counter 64 to count down and the upstream signal 52 causes the counter 64 to count up. Note that the sign of the output of the counter 64 determines the direction of fluid flow. The invention could be implement in either hardware or software.

Figure 5:
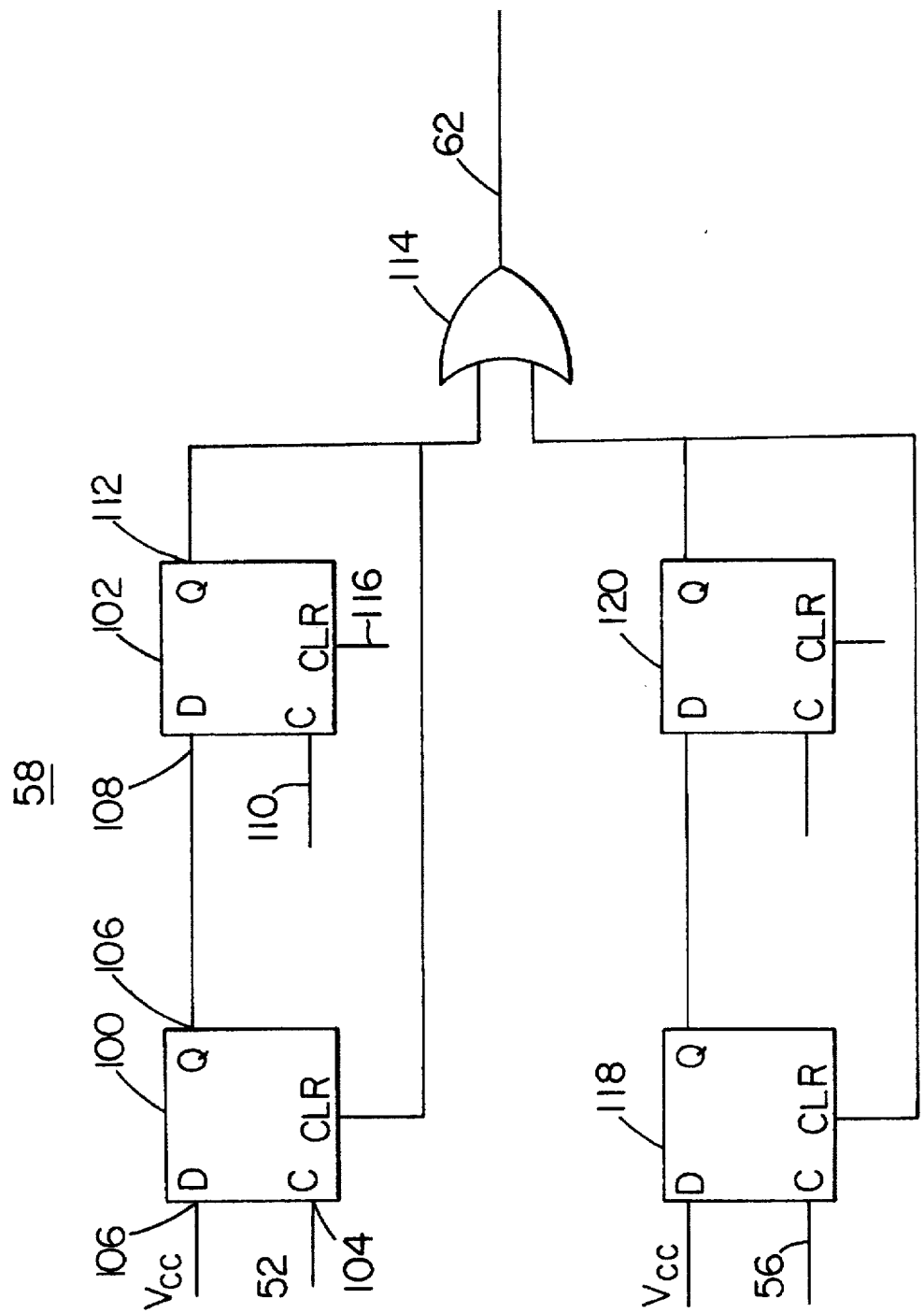
FIG. 5 is a schematic diagram of an embodiment of a synchronization and hold circuit.

An embodiment of the synchronization and control circuit 58 is shown in FIG. 5. The upstream part of the synchronization and control circuitry 58 consists of a pair of D flip flops 100, 102. The upstream signal 52 is coupled to the C input 104 of the flip flop 100. The D input 106 is held high by a supply voltage ($V_{cc}$). The upstream signal 52 sets the flip flop 100 when the signal 52 goes high, causing the Q output 106 to go high. As a result the D input 108 of the flip flop 102 goes high. The C input of the flip flop 102 is the up-clock signal 110 (See FIG. 4) which goes high before the falling edge 96 of the positive portion 80 of the counter control signal 60. This causes the Q output 112 to go high. The Q output 112 is coupled to an OR gate 114 that combines the upstream and downstream signal onto output line 62. The flip flop 102 is cleared by signal 116, that goes high on the falling edge 96 of the positive portion 80 of the counter control signal 60. This produces a short up-counting pulse that is synchronized with the counter control signal 60. The downstream portion works similarly on the opposite edge and also is comprised of two D flip flops 118, 120.

Thus there has been described a method and apparatus for determining the flow count in a ultrasonic meter. The apparatus uses simple logic circuitry in one embodiment that is inexpensive and the apparatus can determine the direction of fluid flow. It should also be noted that a speed count for the ultrasonic flow meter can be implemented by replacing the up-down counter 64, with a standard counter that adds the outputs of the VCO 50 and VCO 54.

While the invention has been described in conjunction with specific embodiments thereof, it is evident that many alterations, modifications, and variations will be apparent to those skilled in the art in light of the foregoing description. For instance, the upstream signal could decrement the counter and the downstream signal could increment the counter. Accordingly, it is intended to embrace all such alterations, modifications, and variations in the appended claims.

What is claimed is:

1. An apparatus for determining a flow count in an ultrasonic flow meter comprising:

an upstream oscillator having an upstream signal with a period proportional to an upstream transit time;

a downstream oscillator having a downstream signal with a period proportional to a downstream transit time; and a counter having a positive increment input coupled to the upstream signal, a negative increment input coupled to the downstream signal and an output with a counter signal proportional to the flow count.

2. The apparatus of claim 1, wherein the positive increment input is a positive period of a counter control signal.

3. The apparatus of claim 1, wherein the negative increment input is a negative period of a counter control signal.

4. The apparatus of claim 1, wherein the counter is an up-down counter.

5. The apparatus of claim 1, further including a synchronization and hold circuit having a pair of inputs coupled to the upstream signal and the downstream signal.

6. The apparatus of claim 5, wherein an output of the synchronization and hold circuit is true during a positive period of a counter control signal, if a positive going edge of the upstream signal occurs between a first falling edge before the positive period and an end of the positive period.

7. The apparatus of claim 5, wherein an output of the synchronization and hold circuit is true during a negative period of the counter control signal, if a positive going edge of the downstream signal occurs between a first rising edge before the negative period and an end of the negative period.

8. The apparatus of claim 1, further including a latch coupled to an output of the counter.

9. The apparatus of claim 9, wherein the output of the latch is coupled to a microprocessor.

10. A method for determining a flow data count in an ultrasonic flow meter, comprising the steps of:

(a) adjusting a period of an upstream signal to be an integer divisor of an upstream transit time;

(b) adjusting a period of a downstream signal to be an integer divisor of a downstream transit time;

(c) counting the periods of the upstream signal to form an up count;

(d) counting the periods of the downstream signal to form a down count; and (e) subtracting the down count from the up count to form a count signal proportional to the flow data count.

11. The method of claim 10, further including the steps of:

(f) sampling the count signal to form a sample;

(g) storing the sample.

12. The method of claim 11, further including the step of:

(h) retrieving the sample by a microprocessor.

13. An apparatus for determining a flow data count in an ultrasonic flow meter, comprising:

an up-down counter having a positive increment input coupled to an upstream signal and a negative increment input coupled a downstream signal; and a latch circuit coupled to an output of the counter.

14. The apparatus of claim 13, further including a synchronization and hold circuit having a pair of inputs, one of the pair of inputs coupled to the upstream signal and a second of the pair of inputs coupled to the downstream signal.

15. The apparatus of claim 14, further including a counter control signal having a frequency at least twice a maximum frequency of the downstream signal, the counter control signal coupled to the synchronization and hold circuit and the up-down counter.

16. The apparatus of claim 15, wherein the synchronization and control circuit has an output that is true during a positive portion of the counter control signal when a positive going edge of the upstream signal occurs between a first falling edge before the positive portion and an end of the positive portion.

17. The apparatus of claim 16, wherein the synchronization and control circuit has an output that is true during a negative portion of the counter control signal when a positive going edge of the downstream signal occurs between a first rising edge before the negative portion and an end of the negative portion.

18. The apparatus of claim 17, wherein the up-down counter increments when the counter control signal is in the positive portion and the output of the synchronization and control circuit is true.

19. The apparatus of claim 17, wherein the up-down counter decrements when the counter control signal is in the negative portion and the output of the synchronization and control circuit is true.

20. The apparatus of claim 13, wherein the latch circuit periodically samples the output of the up-down counter.

21. The apparatus of claim 20, where an output of the latch circuit is polled by a microprocessor.

* * * * *